United States Patent Office 3,195,998
Patented July 20, 1965

3,195,998
TRIAZINE COMPOSITION AND METHOD OF INFLUENCING THE GROWTH OF PLANTS THEREBY
Enrico Knüsli, Riehen, near Basel, Jürg Rumpf, Binningen, near Basel, and George Anton Klein, Basel, Switzerland, assignors to J. R. Geigy A.-G., Basel, Switzerland
No Drawing. Filed Feb. 17, 1961, Ser. No. 89,930
Claims priority, application Switzerland, Feb. 19, 1960, 1,910/60
10 Claims. (Cl. 71—2.5)

The present invention relates to new triazine derivatives with valuable herbicidal properties, as well as processes for their preparation and their use for inhibiting plant growth.

It has been found that symmetrical triazine derivatives of the general formula

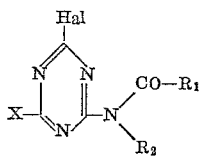

(I)

in which

Hal signifies chlorine, bromine or fluorine,
$R_1$ signifies hydrogen or a low molecular alkyl or alkenyl radical,
$R_2$ signifies hydrogen or a low molecular alkyl, alkenyl or alkoxyalkyl radical, and
X signifies chlorine, bromine or fluorine or an $$-N\begin{matrix}R_3\\ \\R_4\end{matrix}$$

radical in which $R_3$ is a low molecular alkyl, alkenyl or alkoxyalkyl radical or the radical of a low molecular saturated or unsaturated fatty acid and $R_4$ is a radical corresponding to the definition for $R_2$, possess an excellent herbicidal activity and, if X is a halogen atom, may also be fungicidally active.

For the preparation of the above defined new triazine derivatives, a cyanuric acid trihalide such as cyanuric chloride, cyanuric bromide or cyanuric fluoride, is reacted in an inert organic solvent with one or two mol of an alkali metal salt of an acylamide of the general formula

(II)

in which $R_1$ and $R_2$ have the meanings given above, or is reacted successively with one mol each of alkali metal salts of different such acylamides. Suitable solvents are, for example, aliphatic and aromatic hydrocarbons or ethers. The alkali metal salts of the acylamides of the general Formula II, i.e. the salts of lithium, sodium and potassium, may be prepared by known methods, for example by reacting the corresponding acylamides with lithium amide or with sodium in inert organic solvents such as, for example, toluene. After preparation of the acylamide salts, the reaction with, for example cyanuric chloride, may be carried out directly after in the same solvent without isolation of the salts.

If the reaction is carried out with one mol of an acylamide salt, it is advantageous to effect the reaction at low temperatures, for example, at —15° to 0°. If two mol of an acylamide salt are reacted, it is advantageous to replace the second halogen atom by the acylamino radical at somewhat higher temperature, for example at 30–40° C.

Suitable starting substances of the general Formula II are, for example, the sodium, potassium and lithium salts of the following acylamides: N-ethyl-acetamide, N-methylacetamide, propionylamide, N-ethyl-propionylamide, N-butylacetamide, N-ethyl-trimethylacetamide, N-allylacetamide, N-(β-methoxyethyl)-acetamide, N-(γ-methoxypropyl-)acetamide and N-methyl formamide etc.

Conforming to a modification of this process, the cyanuric acid trihalide may be reacted successively and in any order with 1 mol of an acylamide alkali salt of the general Formula II and, in the presence of an acid binding agent, with one mol of an amine of the general formula

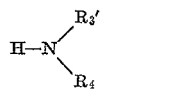

(III)

in which $R_4$ has the above significance and $R_3'$ represents a low molecular alkyl, alkenyl or alkoxyalkyl radical. Amines of the general Formula III which may be mentioned are, for example, ethylamine, diethylamine, isopropylamine, allylamine and γ-methoxypropylamine. Alkali metal hydroxides or carbonates or an additional equivalent of the amine to be reacted may serve as acid binding agents.

A further variant of this process consists in reacting known compounds of the general formula

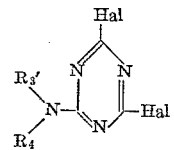

(IV)

with one mol of an alkali metal salt of an acylamide of the general Formula II in an inert organic solvent.

According to a second process, monoacylated halogenamino symmetrical triazines corresponding to the general Formula I and having the more specific general formula

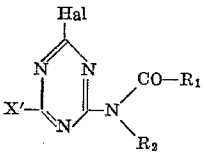

(V)

in which Hal, $R_1$ and $R_2$ have the meanings given above and X' represents a halogen atom or a

radical in which $R_3'$ represents a low molecular alkyl, alkenyl or alkoxyalkyl radical and $R_4$ is defined as above, may be prepared by acylating under heating in an inert organic solvent, preferably boiling between 100 and 150° C., a compound of the general formula

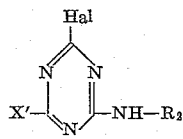
(VI)

in which Hal, $R_2$ and $X'$ have the above meanings, with a reactive functional derivative of a carboxylic acid of the general formula <p style="text-align:center">HOOC—$R_1$     (VII)</p> in which $R_1$ has the meaning given above, especially with an excess of an anhydride of such an acid. In order to obtain good yields in this process, the reaction conditions and the reaction period, preferably between 1 and 5 hours, are so chosen that monoacylation takes place in the starting substances without the reaction simultaneously going too far with hydrolysis of the halogen attached to the nucleus by the acid set free during the acylation. The following anhydrides may be used, for example, as reactive functional derivatives of carboxylic acids of the general Formula VII: acetic anhydride, propionic anhydride, butyric or isobutyric anhydride, as well as the anhydrides of crotonic acid, acrylic acid, methacrylic acid and so on, and also formic acid-acetic acid anhydride as a reactive derivative of formic acid for introduction of the formyl radical.

The following may be mentioned as examples of suitable starting substances of the general Formula VI:

2,4-dichloro-6-methylamino-1,3,5-triazine,
2,4-dichloro-6-ethylamino-1,3,5-triazine,
2,4-dichloro-6-isopropylamino-1,3,5-triazine,
2,4-dichloro-6-butylamino-1,3,5-triazine,
2,4-difluoro-6-ethylamino-1,3,5-triazine,
2,4-dichloro-6-(γ-methoxypropylamino)-1,3,5-triazine,
2,4-dibromo-6-isobutylamino-1,3,5-triazine,
2,4-dichloro-6-allylamino-1,3,5-triazine,
2-chloro-4,6-bis-ethylamino-1,3,5-triazine,
2-fluoro-4,6-bis-ethylamino-1,3,5-triazine,
2-fluoro-4,6-bis-isopropylamino-1,3,5-triazine,
2-chloro-4,6-bis-sec. butylamino-1,3,5-triazine,
2-bromo-4,6-bis-methylamino-1,3,5-triazine,
2-chloro-4,6-bis-allylamino-1,3,5-triazine,
2-chloro-4-ethylamino-6-isopropylamino-1,3,5-triazine,
2-chloro-4-diethylamino-6-ethylamino-1,3,5-triazine,
2-chloro-4-n-propylamino-6-isopropylamino-1,3,5-triazine,
2-chloro-4-allylamino-6-ethylamino-1,3,5-triazine,
2-bromo-4-ethoxyethylamino-6-dimethylamino-1,3,5-triazine,
2-chloro-4-ethylamino-6-diallylamino-1,3,5-triazine.

A large part of these starting substances is known, the rest may be prepared by known methods.

As the inert solvents, the following, boiling between 100 and 150°, are preferably used: n-octane, methylcyclohexane, petrol fractions, toluene, xylenes, ethylbenzene, dibutyl ether, anisole, dioxan, acetal, methylisobutyl ketone, butyl acetate, chlorobenzene, tetrachloroethane, tetrachloroethylene, nitromethane, 1,3-propane dichloride and 2-hexanone.

According to a modification of this process, compounds of the general Formula I are obtained when the monoacylation of the compound of the general Formula VI is effected by reacting it with a low molecular aliphatic ketene, especially with carbomethylene, in the presence of a catalyst such as little amounts of a mineral acid.

Particularly effective herbicidal compositions according to this invention comprise as an active herbicide, a triazine derivative of the general Formula I wherein Hal is a chlorine, bromine or fluorine atom; $R_1$ is hydrogen, lower alkyl or lower alkenyl, $R_2$ is hydrogen, lower alkyl, lower alkenyl or lower alkoxy-lower alkyl, and X is chlorine, bromine, fluorine or

$R_3$ being lower alkyl, lower alkenyl, lower alkoxy-lower alkyl or lower unsaturated or lower saturated acyl and $R_4$ having the same meaning as $R_2$. By the term "lower" is meant radicals containing 1–4 carbon atoms. Examples of lower alkenyl radicals are allyl, vinyl, propylidene etc. Lower alkoxy-lower alkyl radicals are, for example, β-ethoxyethyl, methoxymethyl, γ-methoxypropyl etc. Examples of unsaturated acyl radicals are crotonyl acryl, dimethylacryl etc.

It is not desired to restrict the new triazine compounds to only the specific ones shown in the following examples. Any compounds falling under the generic compound are applicable. Further exemplification of compounds obtainable according to the procedures found in Example 1 are:

2-chloro-4,6-bis-(N-acetyl-vinylamino)-1,3,5- triazine,
2-chloro-4,6-bis-(N-acetyl-propylideneamino)-1,3,5-triazine,
2-chloro-4,6-bis-(N-acetyl-β-ethoxyethylamino)-1,3,5-triazine,
2-chloro-4,6-bis-(N-acetyl-methoxymethylamino)-1,3,5-triazine,
2-chloro-4,6-bis-(N-acrylyl-ethylamino)-1,3,5-triazine,
2-chloro-4,6-bis-(N-dimethylacrylyl-ethylamino)-1,3,5-triazine,
2,4-dichloro-6-(N-acetyl-vinylamino)-1,3,5-triazine,
2,4-dichloro-6-(N-acetyl-propylideneamino)1,3,5-triazine,
2,4-dichloro-6-(N-acetyl-β-ethoxyethylamino)1-,3,5-triazine,
2,4-dichloro-6-(N-acetyl-methoxymethylamino)1,3,5-triazine,
2,4-dichloro-6-(N-acrylyl-ethylamino)-1,3,5-triazine,
2,4-dichloro-6-(N-dimethylacrylyl-ethylamino)-1,3,5-triazine,
2-chloro-4,6-bis-(N-acetyl-vinylamino)-1,3,5,-triazine,
2-chloro-4,6-bis-(N-acetyl-propylideneamino)-1,3,5-triazine,
2-chloro-4,6-bis-(N-acetyl-β-ethoxylamino)-1,3,5-triazine,
2-chloro-4,6-bis-(N-acetyl-methoxymethylamino)-1,3,5-triazine,
2-chloro-4,6-bis-(N-acrylyl-ethylamino)-1,3,5-triazine, and
2-chloro-4,6-bis-(N-dimethylacryl-ethylamino)-1,3,5-triazine.

The preparation of the new active substances according to the invention is illustrated in more detail by the following examples. Parts therein represent parts by weight. The temperatures are given in degrees centigrade.

Example 1

9.2 parts (2 equivalents) of sodium are pulverised at 110° in 1000 parts of anhydrous toluene and then 36 parts (2 equivalents) of N-ethylacetamide dissolved in 500 parts of toluene are dropped in at this temperature. After the reaction has finished, 38 parts (1 equivalent) of cyranuric chloride in 200 parts of toluene are dropped in at −15°. The suspension is stirred for 20 hours at 20°, then for 23 hours at 50°. After cooling, it is treated with water, the phases are separated and the organic phase is washed with water, dried with sodium sulphate and the toluene is distilled off. The residue is distilled. the 2-chloro-4,6-bis-(N-acetyl-ethylamino)-1,3,5-triazine boils at 124–128°/0.003 mm.

The following compounds are obtained in a similar way using 2 equivalents of asylamide salt and 1 equivalent of cyanuric halide:

2-chloro-4,6-bis-(N-acetyl-n-butylamino)-1,3,5-triazine, B.P. 131°/0.0005 mm.,
2-chloro-4,6-bis-(N-butyryl-methylamino)-1,3,5,-triazine, B.P. 140°/0.002 mm.,
2-fluoro-4,6-bis-(N-acetyl-ethylamino)-1,3,5-triazine, B.P. 106–115°/0.08 mm.,
2-chloro-4,6-bis-(N-crotonyl-ethylamino)-1,3,5-triazine, B.P. 155–156°/0.004 mm.,
2-chloro-4,6-bis-(n-formyl-methylamino)-1,3,5-triazine,
2-chloro-4,6-bis-[N-acetyl-(γ-methoxy-propylamino]-1,3,5-triazine, B.P.>150°/0.03 mm. under decomposition,
2-chloro-4,6-bis-(N-acetyl allylamino)-1.3.5-triazine, B.P. 150–160°/.008 mm.

Example 2

46 parts of lithium amide are suspended in 5000 parts of toluene. 180 parts of N-ethyl-acetamide (1 equivalent) are then added dropwise to this suspension. The suspension so obtained is heated for 40 hours at 110° and the 380 parts of cyanuric chloride (1 equivalent) in 2000 parts of toluene are added dropwise at —15°. After heating for 24 hours at 40–50°, the reaction mixture is cooled, washed with water until the washing water is neutral and finally the solvent is evaporated off. The residue is distilled. The 2,4-dichloro-6-(N-acetylethylamino)-1,3,5-triazine obtained boils at 83–90°/0.0005 mm. Hg and, after recrystallising from petroleum ether, it melts at 49–51°.

By reacting only one equivalent of an acylamide salt with one equivalent of cyanuric halides, the following compounds may be prepared in an analogous way:

2,4-dichloro-6-(N-n-butyryl-methylamino)-1,3,5-triazine, B.P. 108–116°/0.01 mm.,
2,4-dichloro-6-(N-formyl-methylamino)-1,3,5-triazine, M.P. 125°,
2,4-dichloro-6-(N-crotonyl-ethylamino)-1,3,5-triazine, B.P. 118°/0.001 mm.
2,4-dichloro-6-(N-acetyl-allylamino)-1,3,5-triazine, B.P. 102–105°/0.004 mm.,
2,4-fluoro-6-(N-acetyl-ethylamino)-1,3,5-triazine, B.P. 43–46°/0.02 mm.,
2,4-dichloro-6-[N-acetyl-(γ-methoxypropylamino)]-1,3,5-triazine, B.P. 137–140°/0.05 mm.

Example 3

To produce an acylamide sodium salt, 23 parts of sodium are pulverised in 3000 parts of toluene and 87 parts of N-ethylacetamide dissolved in 1000 parts of toluene are added dropwise at 100° to this mixture. On completion of the reaction, a solution of 221 parts of the known compound 2,4-dichloro-6-diethylamino-1,3,5-triazine in 500 parts of toluene is added dropwise. After stirring for 24 hours at 60°, the reaction mixture is cooled and the product is worked up as described in Example 1. The 2 - chloro - 4-diethylamino-6-(N-acetyl-ethylamino)-1,3,5-triazine obtained boils at 125°/0.0009 mm. Hg.

Example 4

2,4 - dichloro-6-(N-acetyl-ethylamino)-1,3,5-triazine is first produced from 1 equivalent of cyranuric chloride and 1 equivalent of N-ethyl acetamide either as described in Example 2 or on using pulverized sodium instead of lithium amide. 235 parts of the 2,4-dichloro-6-(N-acetylethylamino)-1.3.5-triazine so obtained are then dissolved in 2000 parts of benzene and a solution of 118 parts of isopropylamine (excess to bind the hydrochloric acid) in 500 parts of benzene is added dropwise to this solution at room temperature. After refluxing for 16 hours, the reaction mixture is filtered, the benzene is distilled off and the residue is recrystallised from petroleum ether. The 2-chloro-4-isopropylamino-6-(N-acetyl-ethylamino)-1,3,5-triazine so obtained melts at 94–97°.

By reacting one mol of an acylamide salt and one mol of an amine of the general Formula III in this or in the other sequence, further compounds, mentioned after Example 5, may be prepared starting from cyanuric halides.

Example 5

100 parts of 2-chloro-4,6-bis-ethylamino-1,3,5-triazine and 105 parts of acetic acid anhydride in 500 parts of chlorobenzene are refluxed for 2 hours. After distilling off half of the solvent, unreacted 2-chloro-4,6-bis-ethylamino-1,3,5-triazine is filtered off hot and filtrate is concentrated to dryness in vacuo. The crystalline residue is taken up in 250 parts of acetone; the solution is filtered and, while stirring, poured into 1500 parts of ice water. The 2-chloro-4-ethylamino-6-(N-acetyl-ethylamino)-1,3,-5-triazine so obtained as colourless precipitate melts at 104°–105° and can be recrystallised from petroleum ether.

The following compounds are obtained in a similar way:

2-chloro-4-ethylamino-6-(N-propionyl-ethylamino)-1,3,5-triazine, M.P. 89–91°,
2-chloro-4-ethylamino-6-(N-isobutyryl-ethylamino)-1,3,5-triazine, M.P. 97–100°,
2-fluoro-4-ethylamino-6-(N-acetyl-ethylamino)-1,3,5-triazine, M.P. 114–116°,
2-chloro-4-diethylamino-6-[N-acetylamino]-1,3,5-triazine, M.P. 100–102°,
2-chloro-4-(γ-methoxypropylamino)-6-[N-acetyl-(γ-methoxypropyl-amino)]-1,3,5-triazine, M.P. 61–64°,
2-bromo-4-ethylamino-6-(N-acetyl-ethylamino)-1,3,5-triazine, M.P. 113–115°,
2-chloro-4-isopropylamino-6-(N-acetyl-ethylamino)-1,3,5-triazine, M.P. 94–97°,
2-chloro-4-allylamino-6-(N-acetyl-allylamino)-1,3,5-triazine, M.P. 74–77°.

Example 6

23 parts of 2-chloro-4-diethylamino-6-ethylamino-1,3,5-triazine and 2 parts of concentrated sulphuric acid are dissolved in 200 parts of benzene. For the monoacetylation, carbomethylene (ketene) in gaseous form is introduced into this solution for 2 hours at 60°. On completion of the reaction, the benzene solution is washed with sodium carbonate solution and water and dried over sodium sulphate. After distilling off the benzene, the residue is distilled. The 2-chloro-4-diethylamino-6-(N-acetylethylamino)-1,3,5-triazine so obtained boils at 115–125° under 0.0009 mm. Hg and is identical with the compound obtained according to Example 3. In the pure form, the compound is crystalline.

From ketene and 2-chloro-4,6-bis-(methylamino)-1,3,5-triazine with acetone as solvent, 2-chloro-4-methylamino-6-(N-acetylmethylamino)-1,3,5-triazine (M.P. 156–158°) is obtained, and from ketene and 2-chloro-4,6-bis-(ethylamino)-1,3,5-triazine with acetone as solvent, 2-chloro-4-ethylamino-6-(N-acetylethylamino)-1,3,5-triazine is obtained (M.P. 104–105°, B.P.$_{0.05}$ 135–138°) in an alalogous manner.

The compounds of the general Formula I defined at the beginning, mentioned above as well as others, are particularly suitable as active substances for weed control agents, both for the selective suppression and destruction of weeds among cultivated plants and for the complete destruction and prevention of undesired plant growth. By weeds are here also meant unwanted, e.g. formerly grown, cultivated plants. The above-defined compounds, moveover, are also suitable as active substances for carrying out other inhibiting effects on plant growth, especially defoliation, e.g. of cotton plants, acceleration of maturity by premature drying, e.g. of potato plants, and also reduction of setting of fruit, extension of the harvesting periods and of the storability.

The weed control agents according to the invention may be solutions, emulsions, suspensions or dusts, the form of application depending entirely on the purpose for which they are used. Suitable carriers are inert solid carriers, high boiling organic solvents, volatile solvents or water. Emulsifying or dispersing agents may be added to said carriers (especially when in water or when intended for use in water) to ensure proper dispersibility. All forms of application have merely to ensure that the active substance is finely distributed. Especially in the total destruction of plant growth, in premature drying and in defoliation, the action can be intensified by the use of carriers which are themselves phytotoxic, such as for example, high boiling mineral oil fractions; on the other hand the selectivity of the growth inhibition generally comes more clearly into play during the use of carriers inert towards plants, e.g. in selective weed killing.

Higher boiling organic liquids such as mineral oil fractions, coal tar oils as well as vegetable and animal oils, are especially suitable for the preparation of solutions. In order to facilitate the solution of the active substances in these liquids, small amounts of organic liquids with better solvent power and usually of lower boiling point may be added where necessary, i.e. solvents such as alcohols, for example ethanol or isopropanol, ketones, for example acetone, butanone or cyclohexanone, diacetone alcohol, cyclic hydrocarbons, for example benzene, toluene or xylene, chlorinated hydrocarbons for example tetrachloroethane or ethylene chloride, or mixtures of the above mentioned substances.

In the case of use in aqueous forms, emulsions and dispersions are primarily concerned. The substances as such or in one of the above mentioned solvents are homogenised in water, preferably by means of emulsifying or dispersing agents. As examples of cationic emulsifying or dispersing agents may be mentioned quaternary ammonium compounds; as examples of anionic emulsifying agents, soaps, soft soaps, alkali metal salts of aliphatic long-chain sulphuric acid monoesters, aliphatic-aromatic sulphonic acids or long-chain alkoxyacetic acids; and as nonionic emulsifying agents, polyethylene glycol ethers of fatty alcohols or alkylphenols and polycondensation products of ethyleneoxide. On the other hand, liquid or paste-like concentrates consisting of active substance, emulsifying agent or dispersing agent and if necessary solvent may also be prepared which are suitable for dilution with water.

Dusts and compositions for scattering may be prepared first of all by mixing or grinding together the active substance with a solid carrier. As such carriers may be used talcum, diatomaceous earth, kaolin, bentonite, calcium carbonate, tricalcium phosphate, sand, and also sawdust, cork powder and other materials of vegetable origin. On the other hand, the substances may also be brought on the carrier by means of a volatile solvent. By addition of wetting agents, e.g. the above mentioned emulsifying agents, and protective colloids, e.g. sulphite waste liquor, pulverulent preparations and pastes which can be suspended in water may be made usable as sprays.

The various forms of application may be adapted more closely to the purposes for which they are to be used in the usual way by addition of substances which improve or reduce the distribution and the power of penetration into the soil according to the depth of the root of the weeds to be killed. Their biological action can likewise be broadened by addition of substances with bactericidal or fungicidal properties, for example, to attain a general sterilisation of the soil or in selective weed control to protect the cultivated plants from other harmful organisms. Substances which also affect plant growth may be wanted for accelerating the start of the action such as, for example, 3-amino-1,2,4-triazole, or if necessary for broadening the spectrum of herbicidal activity such as, for example, salts of $\alpha,\alpha$-dichloropropionic acid. The combination with fertilisers represents in some cases a saving in work and may increase the resistance of the cultivated plants to be protected.

Examples of typical forms of application are given below:

*Example 7*

10 parts of active substance, e.g. 2-chloro-4-isopropyl-amino-6-(N-acetyl - ethylamino) - 1,3,5 - triazine, and 90 parts of talcum are ground as finely as possible in a ball mill, a disc mill or any other suitable mill. The mixture obtained serves as dust.

*Example 8*

20 parts of active substance, e.g. 2-bromo-4-ethylamino-6-(N-acetyl-ethylamino)-1,3,5-triazine, are dissolved in a mixture of 48 parts of diacetone alcohol, 16 parts of xylene and 16 parts of an anhydrous, high molecular weight condensation product of ethylene oxide with higher fatty acids. This concentrate may be diluted with water to give emulsions of any desired concentration.

*Example 9*

50–80 parts of active substances, e.g. 2-chloro-4-ethylamino-6-(N-acetyl ethylamino)-1,3,5-triazine, are mixed with 2–5 parts of a wetting agent, e.g. a sulphuric acid ester of an alkyl polyglycol ether, 1–5 parts of a protective colloid, e.g. spent sulphite liquor, and 14–44 parts of an inert solid carrier material such as, for example, kaolin, bentonite, chalk or kieselguhr, and then finely ground in a suitable mill. The wettable powder obtained may be stirred with water and gives very stable suspensions.

*Example 10*

10 parts of active substances, e.g. 2-chloro-4-ethylamino-6-(N-propionyl-ethylamino)-1,3,5-triazine, are dissolved in 60–80 parts of a high boiling organic liquid, such as, for example, coal tar oil, diesel oil or spindle oil, to which are added 30–10 parts of xylene.

*Example 11*

5–10 parts of active substance, e.g. 2,4-dichloro-6-(N-formyl-methylamino)-1,3,5-triazine, are mixed with 95–90 parts of calcium carbonate (=ground limestone) and ground. The product may be used as a scattering composition.

*Example 12*

95 parts of a granulated carrier material, e.g. sand or calcium carbonate, are moistened with 1–5 parts of water, isopropanol or polyethylene glycol and then mixed with 5 parts of, e.g. 2-chloro-4-methylamino - 6 - (N-acetylmethylamino)-1,3,5-triazine.

The above mixture or one richer in active substance, e.g. from 10 parts of active substance and 90 parts of calcium carbonate, may also be admixed with a multiple amount, e.g. 100–900 parts, of a possibly water soluble artificial fertiliser such as, for example, ammonium sulphate or urea.

*Example 13*

50 parts of active substance, e.g. 2-chloro-4,6-bis-(N-acetyl-ethylamino)-1,3,5-triazine, are introduced into 45 parts of xlyene and 5 parts of a mixture of polyethylene oxide condensation products and spent sulphite liquor are added. A concentrate for the preparation of emulsions, which may be emulsified in water in any proportion, is obtained.

The quantities of active substance required per hectare vary in selective weed control according to the sensitivity of the weeds, the resistance of the cultivated plants, the time of application, the climatic conditions and soil conditions, between about 0.25 and 10 kg. per hectare, while for the complete prevention of plant growth 5–20 kg. per hectare have in general to be used. In particular cases the above quantities may also be exceeded.

Example 14

Seed boxes are filled with earth and the seeds of the following plants were placed in each box: mustard, sugar beet, spinach and cucumber. Immediately after planting the seeds, one gramme of 2-chloro-4-ethylamino-6-(N-acetyl-ethylamino)1,3,5-triazine in 100 ml. of water is sprayed per square metre seed box surface, which corresponds to 10 kg. of active substance per hectare. Three weeks after planting, the seedlings of all four types of plants were killed.

Example 15

Various test plants were sown in a freshly prepared bed. Immediately after sowing, 200 ml. of an aqueous preparation of 0.1 g. of 2-chloro-4,6-bis-(N-acetyl-ethylamino)-1,3,5-triazine were sprayed per square metre, which corresponds to a concentration of 1 kg. active substance per hectare. After 47 days, it was found that maize remained uninjured, mustard and flax were only sightly damaged whilst ray grass, sugar beet, luzerne, clover, chickory and hemp were completely or almost completely killed. In this concentration the active substance thus has a strongly selective action.

Example 16

Some time after the shoots have appeared or after the seeds have been sown, cultivated plants are sprayed with 300 ml. of an aqueous preparation of 0.1 g. of 2-chloro-4-ethylamino-6 - (N-acetyl-ethylamino) - 1,3,5 - triazine per square metre, which corresponds to a concentration of 1 kg. active substance per hectare.

After 48 days, kohlrabi, leeks, maize and vetch remained uninjured, wheat, barley and rape were only slightly damaged whereas beans, clover, carrots and spinach were completely destroyed.

In addition to this strongly selective action on cultivated plants, this active substance also had an excellent action on weeds, the seeds of which had germinated naturally from seeds after the cultivated plants had been sown, (species of Mercurialis, Veronica and Umbelliferae). The growth of these weeds was completely inhibited.

In the preparations containing high boiling organic liquids, those having a boiling point range of 140–360° C. have been found suitable. As set forth in the foregoing, the new triazine derivative can be brought onto the carrier, i.e. mixed with a carrier, in the form of a volatile solvent dispersion, e.g. in liquids having a boiling point range of 55–145° C. (e.g. acetone, benzene, xylene, ethylene trichloride, etc.).

What we claim is:

1. A herbicidal composition comprising as an active herbicide, a triazine derivative of the formula

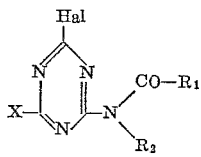

wherein
Hal represents a member selected from the group consisting of chlorine, bromine and fluorine,
$R_1$ represents a member selected from the group consisting of hydrogen, lower alkyl and lower alkenyl,
$R_2$ represents a member selected from the group consisting of hydrogen, lower alkyl, lower alkenyl and lower alkoxy-lower alkyl,
X represents a member selected from the group consisting of chlorine, bromine, fluorine and

in which $R_3$ is a member selected from the group consisting of lower alkyl, lower alkenyl, lower alkoxy-lower alkyl, lower alkanoyl and lower alkenoyl and $R_4$ is the same as $R_2$, in a concentration sufficient to control weeds, and an agricultural adjuvant as carrier therefor.

2. A herbicidal composition comprising, as an active herbicide, 2 - chloro-4-monoethylamino-6-(N-acetyl-ethylamino)-1,3,5-triazine, in a concentration sufficient to control weeds and an agricultural adjuvant as carrier therefor.

3. A herbicidal composition comprising, as an active herbicide, 2 - chloro - 4,6-bis-(N-acetyl-ethylamino)-1,3,5-triazine, in a concentration sufficient to control weeds and an agricultural adjuvant as carrier therefor.

4. A herbicidal composition comprising, as an active herbicide, 2 - chloro - 4-monoisopropylamino-6-(N-acetyl-ethylamino)-1,3,5-triazine, in a concentration sufficient to control weeds and an agricultural adjuvant as carrier therefor.

5. A herbicidal composition comprising, as an active herbicide, 2 - chloro - 4-monoethylamino - 6-(N-propionyl-ethylamino)-1,3,5-triazine, in a concentration sufficient to control weeds and an agricultural adjuvant as carrier therefor.

6. A method of controlling weeds which comprises bringing into contact with at least a part of the weeds, in an amount sufficient to control weeds, a compound of the formula

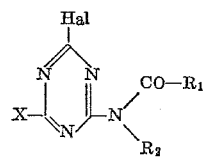

wherein
Hal represents a member selected from the group consisting of chlorine, bromine and fluorine,
$R_1$ represents a member selected from the group consisting of hydrogen, lower alkyl and lower alkenyl,
$R_2$ represents a member selected from the group consisting of hydrogen, lower alkyl, lower alkenyl and lower alkoxy-lower alkyl,
X represents a member selected from the group consisting of chlorine, bromine, fluorine and

in which $R_3$ is a member selected from the group consisting of lower alkyl, lower alkenyl, lower alkoxy-lower alkyl, lower alkanoyl and lower alkenoyl and $R_4$ is the same as $R_2$.

7. A method of controlling weeds which comprises bringing into contact with at least a part of the weeds, in an amount sufficient to control weeds, 2-chloro-4-monoethylamino-6-(N-acetyl-ethylamino)-1,3,5-triazine.

8. A method of controlling weeds which comprises bringing into contact with at least a part of the weeds, in an amount sufficient to control weeds, 2-chloro-4,6-bis-(N-acetyl-ethylamino)-1,3,5-triazine.

9. A method of controlling weeds which comprises bringing into contact with at least a part of the weeds, in an amount sufficient to control weeds, 2-chloro-4-monoisopropylamino-6-(N-acetyl-ethylamino)-1,3,5-triazine.

10. A method of controlling weeds which comprises bringing into contact with at least a part of the weeds, in an amount sufficient to control weeds, 2-chloro-4-monoethylamino-6-(N-propionyl-ethylamino)-1,3,5-triazine.

References Cited by the Examiner

UNITED STATES PATENTS

| | | | |
|---|---|---|---|
| 2,273,687 | 2/42 | Bock et al. | 260—249.8 |
| 2,368,451 | 1/54 | D'Alelio | 260—249.5 |
| 2,507,700 | 5/50 | Emerson et al. | 260—249.6 |
| 2,658,893 | 11/53 | Roemer et al. | 260—249.8 |
| 2,728,767 | 12/55 | Wolf | 260—249.5 |
| 2,763,649 | 9/56 | Albrecht et al. | 260—249.6 |
| 2,891,855 | 6/59 | Gysin et al. | 71—2.5 |
| 2,936,227 | 5/60 | Gysin | 71—2.5 |
| 2,996,505 | 8/61 | Schwarze | 71—2.5 X |

FOREIGN PATENTS

| | | |
|---|---|---|
| 540,590 | 2/56 | Belgium. |
| 1,135,848 | 12/56 | France. |
| 1,239,783 | 7/60 | France. |

OTHER REFERENCES

Smolin et al.: "S-Triazines and Derivatives," pages 235, 272, 274, 281, 285, 293, 297, and 299, Interscience Publishers, Inc., New York (February 1959).

JULIAN S. LEVITT, *Primary Examiner.*

IRVING MARCUS, MAURICE A. BRINDISI, LEWIS GOTTS, *Examiners.*